United States Patent
Nguyen et al.

(10) Patent No.: US 10,436,086 B2
(45) Date of Patent: Oct. 8, 2019

(54) ACTIVE NOISE CONTROL SYSTEM

(71) Applicant: General Electric Company, Schenectady, NY (US)

(72) Inventors: Quoc Nguyen, Houston, TX (US); Eric Fung, Houston, TX (US); Eric Tracy Watson, Houston, TX (US); Arkadiusz Bartlomiej Nagorski, Warsaw (PL)

(73) Assignee: General Electric Company, Schenectady, NY (US)

(*) Notice: Subject to any disclaimer, the term of this patent is extended or adjusted under 35 U.S.C. 154(b) by 967 days.

(21) Appl. No.: 14/424,583

(22) Filed: Feb. 27, 2015

(65) Prior Publication Data

US 2017/0175602 A1 Jun. 22, 2017

(51) Int. Cl.
*G10K 11/16* (2006.01)
*F01N 1/06* (2006.01)
(Continued)

(52) U.S. Cl.
CPC ............ *F01N 1/065* (2013.01); *F02C 7/045* (2013.01); *G10K 11/178* (2013.01);
(Continued)

(58) Field of Classification Search
CPC ............ F01N 1/065; G10K 11/1788; G10K 2210/121; G10K 2210/1281; G10K 2210/1282; G10K 2210/3212; G10K 2210/3055; G10K 2210/3211; G10K 2210/30232; G10K 11/178; F02C 7/045; H04R 2499/13; H04R 3/002; H04R 3/00
See application file for complete search history.

(56) References Cited

U.S. PATENT DOCUMENTS 3,936,606 A 2/1976 Wanke
4,665,549 A 5/1987 Eriksson et al.
(Continued)

FOREIGN PATENT DOCUMENTS

CN 1310785 C 4/2007
EP 1162600 12/2001
(Continued)

OTHER PUBLICATIONS

PCT Search Report and Written Opinion issued in connection with corresponding Application No. PCT/PL2014/000150 dated Apr. 7, 2015.
(Continued)

*Primary Examiner* — Thang V Tran
(74) *Attorney, Agent, or Firm* — Fletcher Yoder, P.C.

(57) ABSTRACT

A system includes an Active Noise Control (ANC) module unit configured to be installed within an air intake or exhaust of a power generation unit. The ANC module unit includes an ANC housing shaped to fit within the air intake or exhaust, an ANC core configured to be secured within the ANC housing, which includes a microphone configured to detect a sound generated by the power generation unit, a control board configured to control the noise-canceling sound based on the sound signal from the microphone and a set of pre-determined noise reduction transfer functions, and a first speaker configured to deliver a first noise-canceling sound to the air intake or exhaust.

21 Claims, 7 Drawing Sheets (51) Int. Cl.
*H04R 3/00* (2006.01)
*G10K 11/178* (2006.01)
*F02C 7/045* (2006.01)

(52) U.S. Cl.
CPC .. *G10K 11/17857* (2018.01); *G10K 11/17873* (2018.01); *F01N 2590/10* (2013.01); *G10K 2210/1281* (2013.01); *G10K 2210/3055* (2013.01); *G10K 2210/3212* (2013.01); *G10K 2210/3214* (2013.01)

(56) References Cited

U.S. PATENT DOCUMENTS

| | | | |
|---|---|---|---|
| 4,815,139 A | | 3/1989 | Eriksson et al. |
| 4,876,722 A | | 10/1989 | Dekker et al. |
| 5,272,286 A | | 12/1993 | Cain et al. |
| 5,355,417 A | | 10/1994 | Burdisso et al. |
| 5,386,689 A | | 2/1995 | Bozich et al. |
| 5,478,199 A | | 12/1995 | Gliebe |
| 5,602,926 A | * | 2/1997 | Ohashi ............ G10K 11/1784 381/71.11 |
| 5,650,599 A | * | 7/1997 | Madden ............... B64F 1/26 181/218 |
| 5,689,572 A | * | 11/1997 | Ohki ............... G10K 11/1786 381/71.3 |
| 5,828,759 A | | 10/1998 | Everingham |
| 5,850,458 A | * | 12/1998 | Tomisawa ........ G10K 11/1786 381/71.4 |
| 6,084,971 A | | 7/2000 | McLean |
| 6,160,892 A | | 12/2000 | Ver |
| 6,996,242 B2 | | 2/2006 | McLean et al. |
| 2012/0312629 A1 | | 12/2012 | Hawwa |
| 2016/0372106 A1 | * | 12/2016 | Hanazono ............ F24F 13/24 |

FOREIGN PATENT DOCUMENTS

| | | |
|---|---|---|
| JP | 05-001811 A | 1/1993 |
| JP | 10-143169 A | 5/1998 |
| JP | 2002-521601 A | 7/2002 |
| JP | 2003-177760 A | 6/2003 |
| JP | 2004-354769 A | 12/2004 |
| WO | 0005489 A1 | 2/2000 |
| WO | 0054895 A1 | 9/2000 |

OTHER PUBLICATIONS

Japanese Office Action for Application No. 2017-532600, dated Oct. 22, 2018. 7 Pages.

Chinese Office Action for Application No. 201480084222.4, dated Jan. 11, 2019. 9 Pages.

* cited by examiner

ACTIVE NOISE CONTROL SYSTEM

This application is a national stage of PCT Application No. PCT/PL2014/000150, entitled "ACTIVE NOISE CONTROL SYSTEM", filed on Dec. 19, 2014, which is hereby incorporated by reference in its entirety.

BACKGROUND

The subject matter disclosed herein relates to active noise control for use with industrial machinery systems.

Power stations, such as those employing turbine engines or other combustion engines, can generate excess noise within the housing of the equipment. Intake and exhaust ducts convey air/gases and noise from within an inner working zone to the exterior of the housing. Unfortunately, the power station may be placed in an area where sound levels are restricted or unwanted. In this situation, noise control is desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an Active Noise Control (ANC) module unit configured to be installed within an air intake or exhaust of a power generation unit, including an ANC housing shaped to fit within the air intake or exhaust, an ANC core configured to be secured within the ANC housing, including a microphone configured to detect a sound generated by the power generation unit, a control board configured to control the noise-canceling sound based on the sound signal from the microphone and a set of pre-determined noise reduction transfer functions, and a first speaker configured to deliver a first noise-canceling sound to the air intake or exhaust.

In a second embodiment, a system includes an air intake or exhaust for use within a power generation unit, including a plurality of ANC module units, wherein each ANC module unit includes an ANC housing shaped to fit within the air intake or exhaust, an ANC core configured to be secured within the ANC housing, including a microphone configured to detect a sound generated by the power generation unit and a speaker configured to deliver a noise-canceling sound to the air intake or exhaust, and a control board comprising transfer functions pre-determined for multiple inputs and configured to control the noise-canceling sounds from ANC module units in the plurality of ANC module units based on the sound signals received from microphones of the plurality of ANC module units.

In a third embodiment, a system includes an ANC module unit for use within a combustion exhaust of a power generation unit, including a microphone configured to detect a sound generated within the combustion exhaust of the power generation unit, a control board configured to receive the sound signal from the microphone and send a noise-canceling signal based on the sound signal from the microphone and a set of pre-determined noise reduction transfer functions, and a plurality of shakers configured to respond to the noise-canceling signal to shake a plate or an array of plates, and produce noise-canceling sound in the combustion exhaust duct or stack.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include Active Noise Control (ANC) module units that may be used in a system performing an industrial process that generates noise. The ANC module units dampen or reduce noise, for example, exiting an external opening of a duct of the system. Rather than using only passive noise abatement systems such as absorptive, fiber-filled baffles, or ductwork, the ANC module units employ speakers or other acoustic devices that produce sound out of phase with the sound generated by the engine and equipment. This may operate to cancel or reduce the level of noise and, thus, the system is collectively quieter. The ANC module units may operate individually or collectively to reduce noise efficiently, in terms of space and duct pressure-loss.

In some embodiments, each module unit is pre-programmed to respond to the noise according to location-specific characteristics of the system that are pre-defined on a control board of each ANC module unit. Therefore, the ANC module unit may cancel or reduce the noise without using an error microphone. The system may include several ANC module units. The combination of ANC module units produces efficient noise cancelation or reduction across a wide frequency range.

Figure 1:
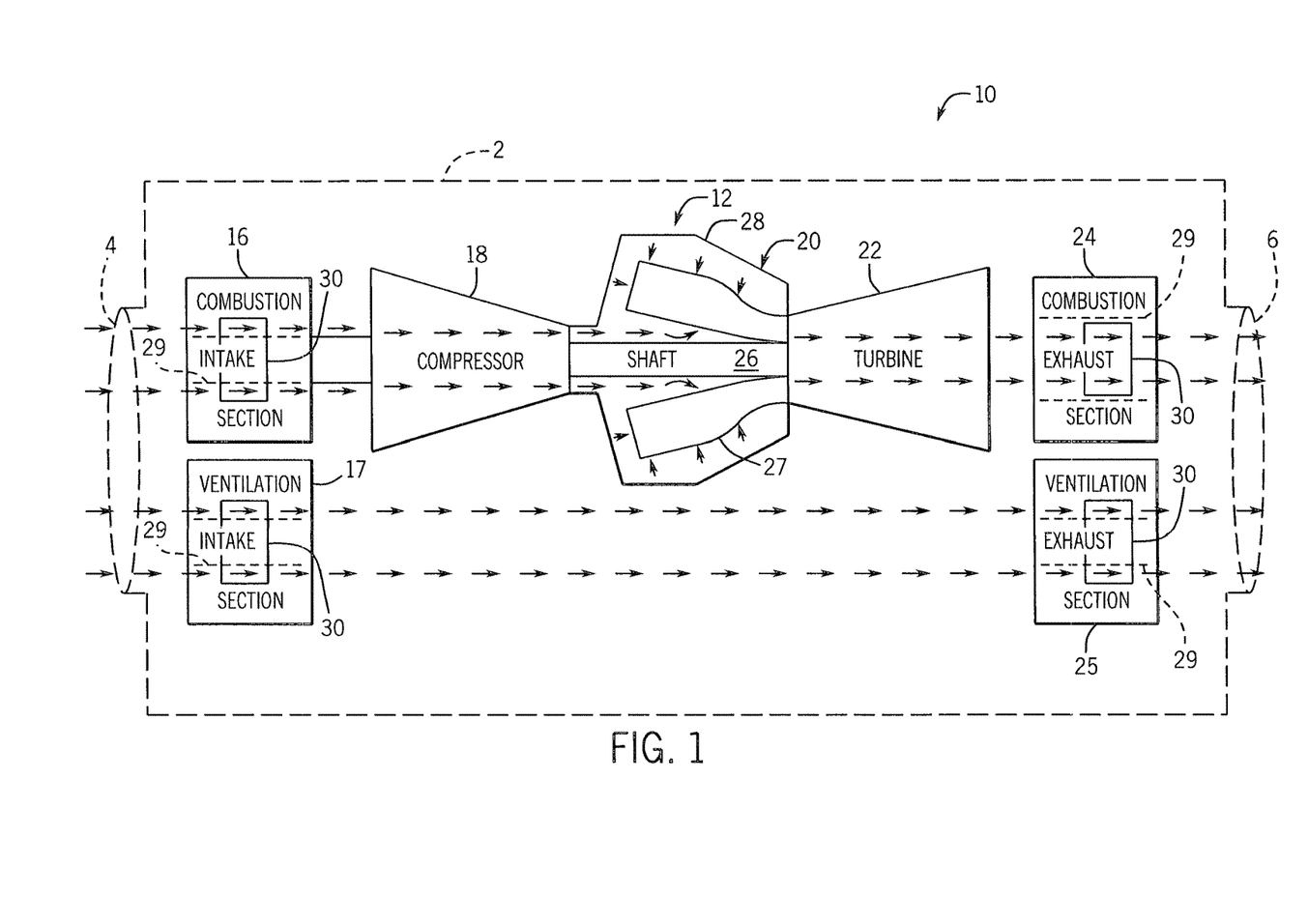
FIG. 1 is a schematic diagram of an embodiment of a gas turbine engine system utilizing an Active Noise Control (ANC) module unit.

FIG. 1 is a block diagram of an exemplary system 10 including a gas turbine engine 12 that may employ ANC module units, as described in detail below. In certain embodiments, the system 10 may include an aircraft, a watercraft, a locomotive, or combinations thereof. The ANC module units may also be employed in other power generation units such as steam turbine units, combustion power generation units, industrial process units, compressors, power drive units, or others. The gas turbine engine 12 is included within a building wall or enclosure 2. The enclosure 2 shields and protects the gas turbine engine 12 from external material and forces, and conducts air around the turbine casing and other supporting components inside the enclosure. The enclosure 2 includes an intake vent 4 and an exhaust vent 6. Each of the intake vent 4 and the exhaust vent 6 may include multiple vents and/or locations where air and other gases are conveyed into and out of the enclosure 2. Additionally, the intake vent 4 and the exhaust vent 6 may include filters, baffles, and/or treatment systems for cleaning the air used in or around the gas turbine engine 12.

The illustrated gas turbine engine 12 includes a combustion air intake section 16 and a ventilation intake section 17 as part of the intake vent 4 of the enclosure 2. The combustion intake section 16 directs air to the gas turbine engine 12 while the ventilation intake section 17 directs air around the gas turbine engine 12, for example, to cool components of the gas turbine engine 12. The gas turbine engine 12 also includes a compressor 18, a combustor section 20, a turbine 22, and an exhaust section 24. The turbine 22 is coupled to the compressor 18 via a shaft 26. As indicated by the arrows, air may enter the gas turbine engine 12 through the intake section 16 and flow into the compressor 18, which compresses the air prior to entry into the combustor section 20. The compressed air from the compressor 18 enters combustors 27, where the compressed air may mix and combust with fuel within the combustors 27 to drive the turbine 22. The illustrated combustor section 20 includes a combustor housing 28 disposed concentrically or annularly about the shaft 26 between the compressor 18 and the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through a series of ducts 29 within the exhaust section 24. Furthermore, as described below, each of the combustion intake section 16, the ventilation intake section 17, the combustion exhaust section 24, and a ventilation exhaust section 25 may include a duct 29. The combustion gases may pass through several additional systems such as steam turbines, heat transfer systems, and exhaust treatment systems, among others. Additionally, while illustrated as being downstream from the gas turbine engine 12, the exhaust section 24, in other embodiments, may be placed after any other noise source or combustion system. The gas turbine engine 12 here is one example of the system 10 in which hot combustion gases may provide design constraints due to relatively high temperatures employed within the system 10. Furthermore, the exhaust section 24 and the ducts 29 may be described as being downstream from the noise source (e.g., gas turbine engine 12), meaning between the noise source and an exit of the system 10. That is, "downstream," when referred to below, is described with respect to the noise source, even if air flow (for example, in the combustion intake section 16 or the ventilation intake section 17) is flowing opposite to the direction of sound travel.

As may be appreciated, the combustion of the mixture of air and fuel may produce an excess of noise. In addition, the noise generated by the compressor section 18 passes through the intake vent 4 and the exhaust vent 6. To combat the noise produced by the system 10, each of the combustion intake section 16, the ventilation intake section 17, the combustion exhaust section 24, and the ventilation exhaust section 25 can include an ANC module unit 30. The ANC module unit 30 for each section may be tuned to the specifics of that location. That is, as explained in detail with regard to the figures below, each of the sections (e.g., the combustion intake section 16, the ventilation intake section 17, the combustion exhaust section 24, and the ventilation exhaust section 25) may include materials and configurations that improve performance of noise control/cancelation in that particular area. The ANC module unit 30 may produce sound that is opposite in phase with the sound produced by the system 10 that is traveling through the section and therefore cancels out and attenuates the sound emanating from the exit of the section. The particular signatures of the sound exiting the section may depend on a number of location-specific characteristics including the geometry of the ducts 29, the location of the ANC module unit 30, physical properties (e.g., temperature, pressure) of the gases passing through the section, among other things. These location-specific characteristics may be collected into a transfer function, which may be hard-wired into one or more ANC module units 30.

Figure 2:
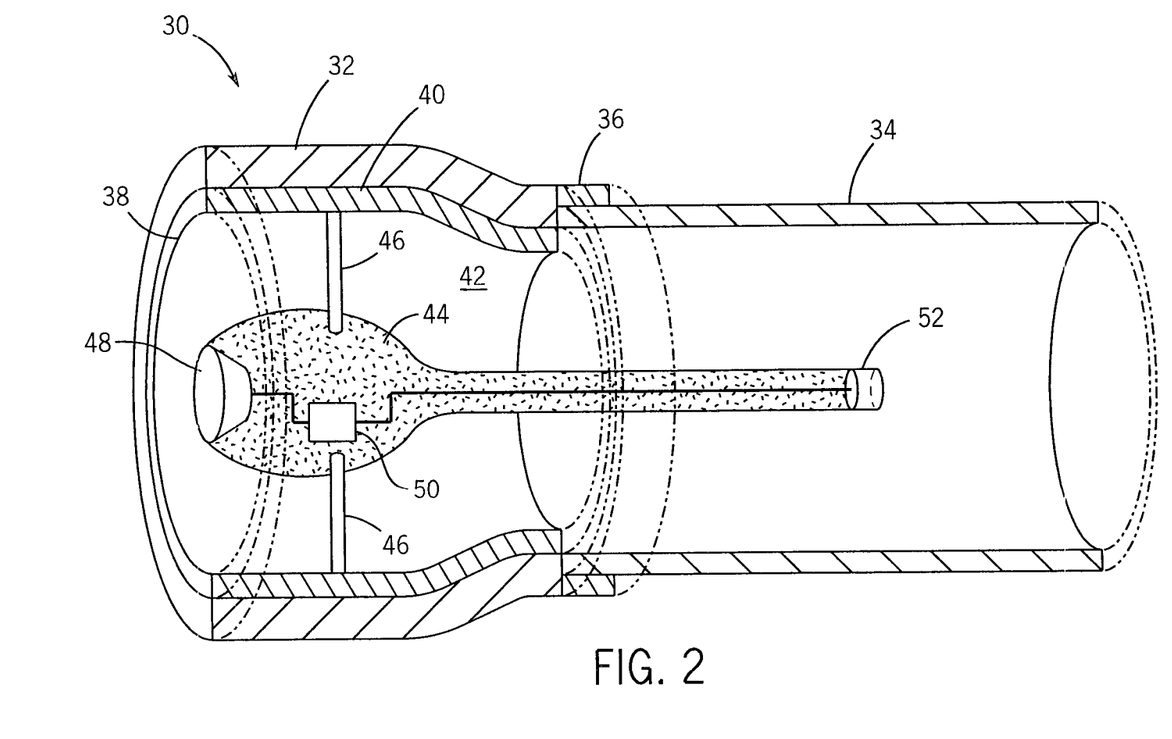
FIG. 2 is a cross-sectional side view of an embodiment of the ANC module unit of the gas turbine engine system of FIG. 1.

FIG. 2 is a cross-sectional side view of an embodiment of the ANC module unit 30 that may be used within the intake vent 4. The ANC module unit 30 includes an ANC housing 32 and a flow diverter 34 (i.e. filter media, or filter cartridge, or filter canister) that are connected to each other by a central cone 36. The central cone 36 may also be used to mount the ANC module unit 30 within the duct 29 of the intake vent 4 (e.g., the combustion intake section 16 or the ventilation intake section 17) of the enclosure 2. Typically, the midstream ANC module unit 30 of FIG. 2 may be mounted mostly within a flow path of the combustion intake section 16 or the ventilation intake section 17, areas where the air in the flow path is relatively cool. Cooler air/gases enables the combustion intake section 16 or the ventilation intake section 17 to include a flow path in which the air/gases flow through or around the flow diverter 34 and the ANC housing 32.

The location-specific constraints of the flow path into which the ANC module unit 30 is placed determine a shape and/or location of the flow diverter 34 (i.e. filter media, or filter cartridge, or filter canister) and the ANC housing 32. The flow diverter 34 (i.e. filter media, or filter cartridge, or filter canister) and/or the ANC housing 32 may, as shown in FIG. 2, have a cylindrical shape. Additionally and/or alternatively, each flow diverter 34 and the ANC housing 32 may be made into other shapes (e.g., rectangular, flat, square, triangular, hexagonal, or others) to enable the ANC module unit 30 to fit a specific location within the system 10, or provide optimum flow conditions. That is, the shape of the ANC housing 32 may be shaped to influence the air/gases to flow with minimum acoustic turbulence. The location of the ANC module unit 30 may be influenced by the available space within the system 10. That is, the ANC module unit 30 may be constrained to areas where other components of the system 10 are absent, and the shape of that space may determine the shape that the ANC housing 32 and the flow diverter 34 should be. Additionally, an amount of noise control produced by the ANC module unit 30 may vary from one position to another and the location of the ANC module unit 30 may be influenced on this potential for noise control.

In addition to the flow diverter 34 (i.e. filter media, or filter cartridge, or filter canister) and the ANC housing 32, the ANC module unit 30 of FIG. 2 includes an ANC core 44, which may be foam covered, that secures additional components that aid in noise control/cancelation. The ANC core 44, as described in detail below, includes the electronic components to capture sound and deliver a noise-canceling sound from the ANC module unit 30. The ANC core 44 may also include a foam structure that is mounted internal to the inner area 42 by waveguides 46 and may include a triangular, a substantially square, a rectangular, a hexagonal, or an octagonal geometry that provides optimum flow conditions. That is, the shape of the ANC core 44 may be shaped to influence the air/gases to flow with minimum acoustic turbulence. As illustrated, the waveguides 46 may secure the ANC core 44 to an inner portion 40 of the ANC housing 32 via thin attachments that minimize impact of the air flow through the ANC module unit 30. In other embodiments, the waveguides 46 may be longer and fin-like such that the flow path through the ANC housing 32 is divided into multiple discrete regions. For example, the ANC housing 32 may be divided into two, three, four, five, six, seven, eight or more discrete regions. Each discrete region may be sized to control or reduce a specific tonal noise or range of noise frequencies. For example, smaller discrete regions corresponding with a higher number of waveguides 46 may reduce tonal noise in a higher frequency range.

The ANC core 44 of FIG. 2 includes one or more speakers 48 mounted in one or more locations to control or reduce sound. As illustrated, the speaker 48 may be located near a front end 38 of the ANC module unit 30. The front end 38, in some embodiments, may be the location from which air enters the ANC module unit 30, and sound exits. That is, in certain embodiments, the sound may be traveling in an opposite direction from the air flow. For example, in FIG. 2 the flow of air may be from the left of the figure to the right while the sound, meanwhile, may travel from right to left of FIG. 2. In specific examples, the flow of air may pass over the ANC module unit 30 radially through the flow diverter 34, which may be constructed of, for example, mesh material or any other material that allows for air passage there through. As mentioned above, the ANC core 44 may include waveguides 46 that divide the ANC housing 32 into discrete regions. For example, there may be two, three, four, five, six, seven, eight, or more discrete regions that divide the ANC housing 32. Each discrete region may include a separate speaker 48 instead of, or in addition to, the front speaker 48 illustrated in FIG. 2. The separate speakers 48 may produce the same sound or may be individually given a signal that focuses on a specific sub-part of the noise within the intake vent 4. For example, a speaker 48 positioned in one discrete region of the ANC module unit 30 may control or reduce sound of one frequency range while a different speaker 48 positioned in a different discrete section of the ANC module unit 30 controls or reduces sound of a different frequency range.

The sound that is produced by the speaker 48 of the ANC core 44 is determined by a control board 50 that is also part of the ANC core 44. The sound may be produced to control or reduce sound generated by the engine 12 between approximately 50 Hz and approximately 4000 Hz. However, in other embodiments, the sound produced may control or reduce sound generated by the engine 12 at frequencies up to approximately 5000 Hz, approximately 6000 Hz, approximately 7000 Hz, approximately 8000 Hz, or more. As described in detail below, the control board 50 may send a noise-canceling signal to multiple speakers 48 that control or reduce sound from multiple ranges. The control board 50 may include, for example, a Single Input Single Output (SISO), Single Input Multiple Output (SIMO), Multiple Input Single Output (MISO), or Multiple Input Multiple Output (MIMO) setup, as desired based on the sound to be canceled.

Different modules, controlling different parts, locations, and/or systems of the filter house may use different transfer functions, which may focus on different frequency ranges. For example, ventilation portion sound transfer function and ANC duct system design may be optimized one way for low-mid frequency, whereas the combustion portion may be optimized for combustion engine noise at low and mid frequency ranges, and at specific high frequency ranges, such as air inlet compressor blade-pass frequencies and harmonics. The control board 50 is programmed with a transfer function which may be stored digitally on permanent or temporary memory (i.e. ROM or RAM memory) that is pre-determined according to location-specific characteristics of the ANC module unit 30 and the installed location (e.g., intake vent 4, combustion intake section 16, ventilation intake section 17, etc.). For example, location-specific characteristics may include the geometric arrangement of the duct 29, the position of the ANC module unit 30, or the potential for reverberation of the surrounding materials (e.g., duct 29, engine 12, etc.).

To determine the sound signal to deliver to the speaker 48, the control board 50 receives the sound signal from a microphone 52, but does not include an error microphone to detect sound downstream from the ANC module unit 30. As illustrated in FIG. 2, the microphone 52 may be placed on the ANC core 44, but the microphone 52 may also be placed on the flow diverter 34, as long as there is a good synchronization and communication between the speaker 48 and the microphone 52. The speaker 48, control board 50, and the microphone 52 may collectively be designated as the ANC core 44, whether the components (i.e., speaker 48, control board 50, and microphone 52) are all located on the same structural component. However, in another embodiment, one or more of the speaker 48, control board 50, and microphone 52 may be in a physically distinct location (e.g. not part of a common enclosure) with one or more of the speaker 48, control board 50, and microphone 52. Additionally, the ANC module unit 30 may include a plurality of microphones 52 to detect and convey noise from a plurality of locations within the intake vent 4. The ANC module unit 30 may thus be positioned to efficiently deliver noise-canceling sound to the right location with the right signal from the plurality of microphones 52. The system 10 as a whole, therefore, is quieter without relying on large passive noise attenuation such as foam or baffles.

Figure 3:
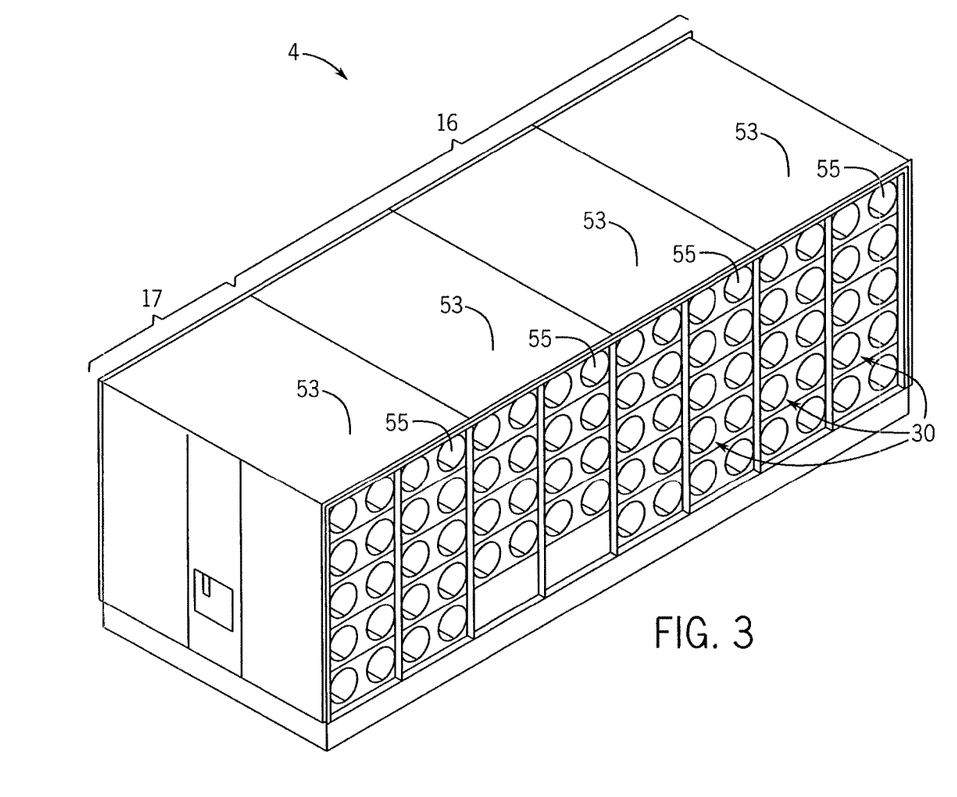
FIG. 3 is a perspective view of an embodiment of an air intake of the gas turbine engine system of FIG. 1.

FIG. 3 is a perspective view of an embodiment of the intake vent 4 of the gas turbine engine system 10 of FIG. 1.

The intake vent 4 includes the combustion intake section 16 and the ventilation intake section 17 as shown in FIG. 1. As illustrated in FIG. 3, the intake vent 4 includes four compartments 53 (a large section for combustion, consisting of 3 compartments in this embodiment, and a small section with 1 compartment for ventilation) having a number of flow path holes 55. One or more of the flow path holes 55 may include one of the ANC module units 30 described above. Each flow path hole 55 may also represent a passage for air/gases which includes one of the ANC module units 30 positioned adjacently to the passage, as described below. In either case, the noise propagates from the noise source from within the intake vent 4 to the microphone 52 and then to the speaker 48 of each of the ANC module units 30. The speaker 48 of the ANC module unit 30 produces sound to control or reduce the noise detected by the microphone 52 based on the transfer function stored on the control board 50.

The location-specific characteristics associated with each position within the compartment 53 contribute to the transfer function stored within the control board 50 of each of the ANC module units 30. For example, the ANC module unit 30 in one position (e.g., one of the flow path holes 55 on a periphery of the compartment 53) may respond to control noise in one frequency range (e.g., 100 Hz-1500 Hz or 100 Hz-2000 Hz) while the ANC module unit 30 in a different position (e.g., one of the flow path holes 55 at the center of the compartment 53) may respond to control noise of a different frequency range (e.g., 1500 Hz-3000 Hz or 1000 Hz-3000 Hz). Additional ANC module units 30 may be combined to further narrow the frequency range of each individual ANC module unit 30. For example, frequency ranges may include approximately 100 Hz-1066 Hz, approximately 1066 Hz-2033 Hz, and approximately 2033 Hz-3000 Hz for three different ANC module units 30. It may be appreciated that other division of frequency ranges are also contemplated. Furthermore, ANC module units 30 may overlap the frequencies that are controlled or reduced. Thus, for a particular set of location-specific characteristics the intake vent 4 as a whole, may efficiently control or reduce the noise emanating from within the enclosure 2 of the system 10.

The size and number of compartments 53 and flow path holes 55 within the compartment 53 may be adjusted to improve sound control and reduction. In the illustrated embodiment, each compartment includes about 20 intake flow path holes 55 through which the air is filtered and/or delivered to the interior sections of the enclosure 2. The combustion intake section 16 and the ventilation intake section 17 may be similar in size, that is, each includes equal number of compartments 53. In other embodiments, the combustion intake section 16 may be larger or smaller than the ventilation intake section 17. For example, the combustion intake section 16 may include three of the four compartments 53 of the intake vent 4, or one of the four compartments 53 of the intake vent 4.

Figure 4:
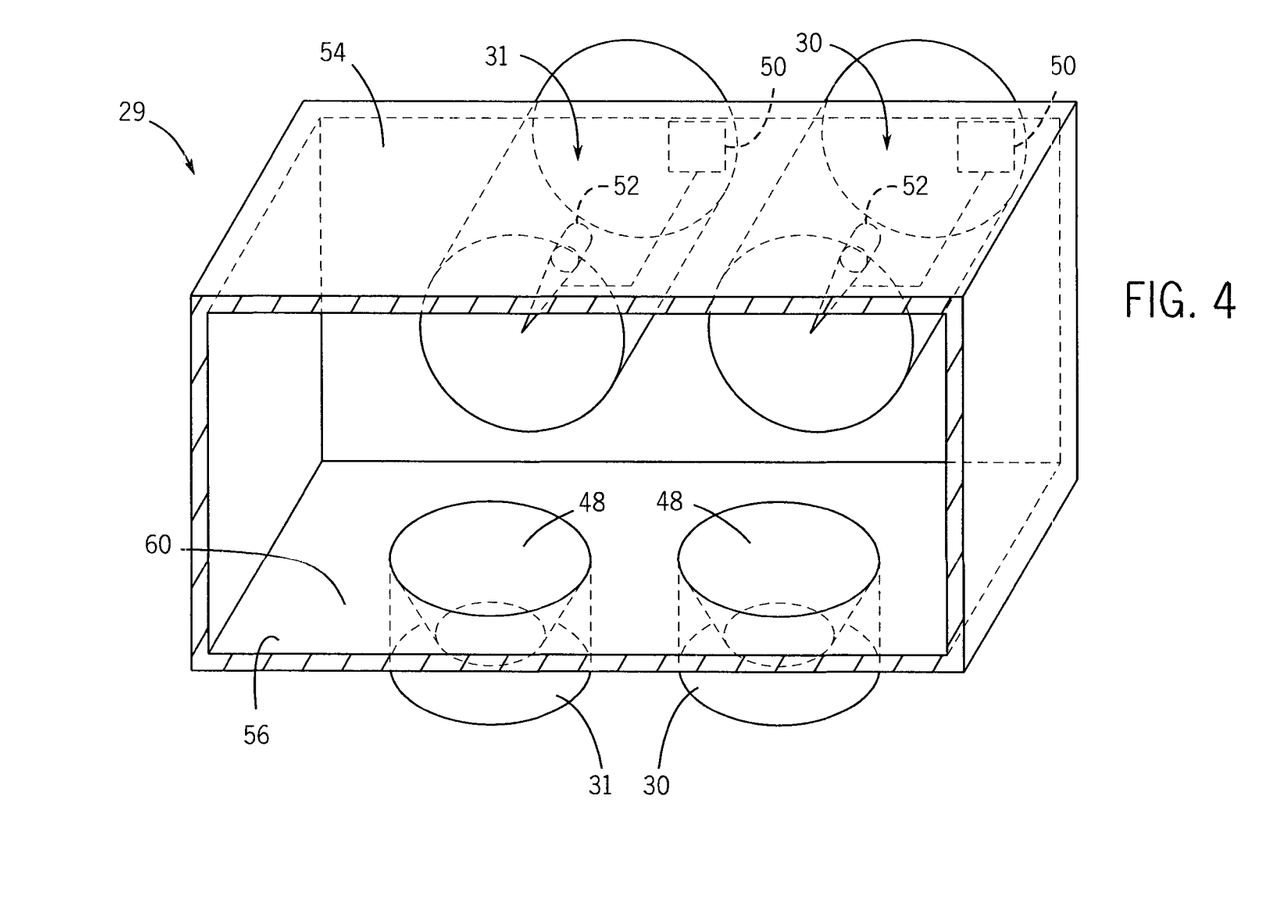
FIG. 4 is a perspective view of an embodiment of the ducts employing ANC module units at the air intake of the gas turbine engine system of FIG. 1.

FIG. 4 is a perspective view of an embodiment of the ducts 29 employing ANC module units 30 and 31 within the intake vent 4 of the system 10 of FIG. 1. The duct 29 of FIG. 4 may be representative of the intake flow path hole 55 illustrated in FIG. 3, or may be located in another location within the enclosure 2 of the system 10. The ANC module units 30, as illustrated, are split such that the microphone 52 of each ANC module unit 30 is positioned on a side 54 and the speakers 48 are positioned on a bottom 56 of the duct 29. Air flow will enter the duct 29 through the surface 60, where side 60 is directly opposite side 54, and go through the air filter, in which ANC module units 30 and 31 are mounted.

Positioning multiple ANC module units 30 may enable more precise and efficient noise cancelation as the inlet air passes through the ducts 29. Additionally, different positions (e.g., side 54 and bottom 56) of the ANC module unit 30 may be more effective at total noise cancellation. Other configurations beside the illustrated embodiments may be employed as well.

As an additional feature of a set of ANC module units 30, 31, when multiple ANC module units 30 are installed in the duct 29, multiple speakers 48 may rely on a single control board 50 to determine the output of the particular speakers 48. That is, the microphones 52 from the ANC module units 30 and 31 may both send the sound signals to a single control board 50, which sends out two noise-canceling signals to the speakers 48. The control board 50 may include separate transfer functions for each speaker 48 of the ANC module units 30 and 31, or may employ the same transfer function for each of the speakers 48 that are connected to it. That is, the pre-determined transfer function programmed into the control board 50 may be programmed to handle the signals from two microphones 52 (in the ANC module units 30 and 31 on the side 54 of the duct 29) to produce the signals for two different speakers 48.

Figure 5:
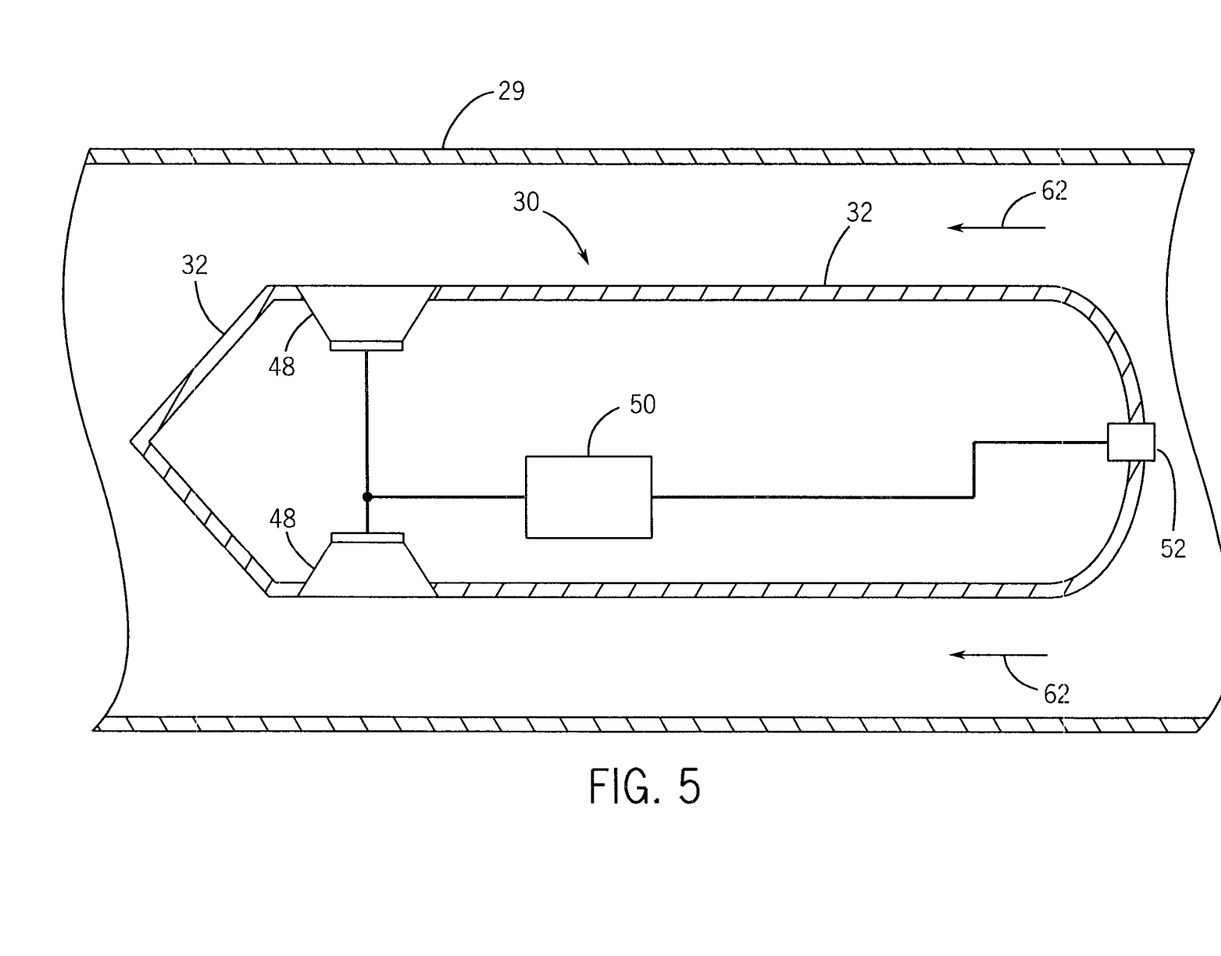
FIG. 5 is a cross-sectional view of an embodiment of the ANC module unit installed in a flow path within a duct of the gas turbine engine system of FIG. 1.

FIG. 5 is a cross-sectional view of an embodiment of the ANC module unit 30 installed in a flow path 62 (i.e. a duct or transition) within the combustion intake section 16 or the ventilation intake section 17 of FIG. 1. This configuration shown in FIG. 5 may also be used in the ventilation exhaust section 25, however, it should be noted that in the vent exhaust case, the airflow as well as the noise move in the same direction, therefore, in that configuration, the microphone would be on the upstream (left) side of the baffle embodiment, and the speaker(s) would be on the right side of the embodiment.

The ANC module unit 30 includes a microphone 52 mounted on the ANC housing 32 within the flow path 62. In the illustrated embodiment of FIG. 5, the ANC housing 32 encloses each of the ANC cores 44 (i.e., speaker 48, control board 50, and microphone 52). In other embodiments, one or more component of the ANC core 44 may be located remotely and electronically connected to components within the flow path 62. Within the ANC module unit 30 are speakers 48 mounted on the inside of the ANC housing 32 and pointing toward the flow path 62. In the embodiment illustrated in FIG. 5, two speakers are mounted to the inner side of the ANC module unit 30 which conveys the sound out into the flow path 62. ANC module unit 30 may also contain portions or sections that are designed to provide passive, dissipative silencing, similar to other non-woven fiber-filled acoustic splitter baffles, to cover a broader frequency range than ANC provides, and/or to supplement the attenuation that ANC is providing. In other embodiments, the speakers 48 may be positioned at other locations, and may include more speakers. For example, the ANC module unit 30 may include 3, 4, 5, 10, or more speakers to cancel the sound propagating through the duct. Advantages of the ANC module unit 30 of FIG. 4 include the ability to install in the middle of the duct 29 of the combustion intake section 16 or the ventilation intake section 17. The ability to position the ANC module unit 30 within, for example, the middle of the duct 29 enables sections of the duct 29 to be utilized in situations, for example, where the side walls of the duct 29 are unable to support the ANC module unit 30, or where the side walls of the duct 29 are adjacent to other structures that prevent placement of the ANC module unit 30. The configuration of the ANC module of FIG. 5 also allows for the use of a plurality of similar or identical ANC modules, to sub-divide the airflow and acoustic pathway into smaller channels, which allows both the dissipative technology (non-woven fiber-filled baffle sections, perforated sheets) as well as the ANC portion of the system to work more effectively. Additionally, these systems may be arranged into two or more groups, where each group has ANC modules arranged in parallel or in a serial fashion to achieve greater attenuation, and/or to focus on specific frequency ranges per group.

Figure 6:
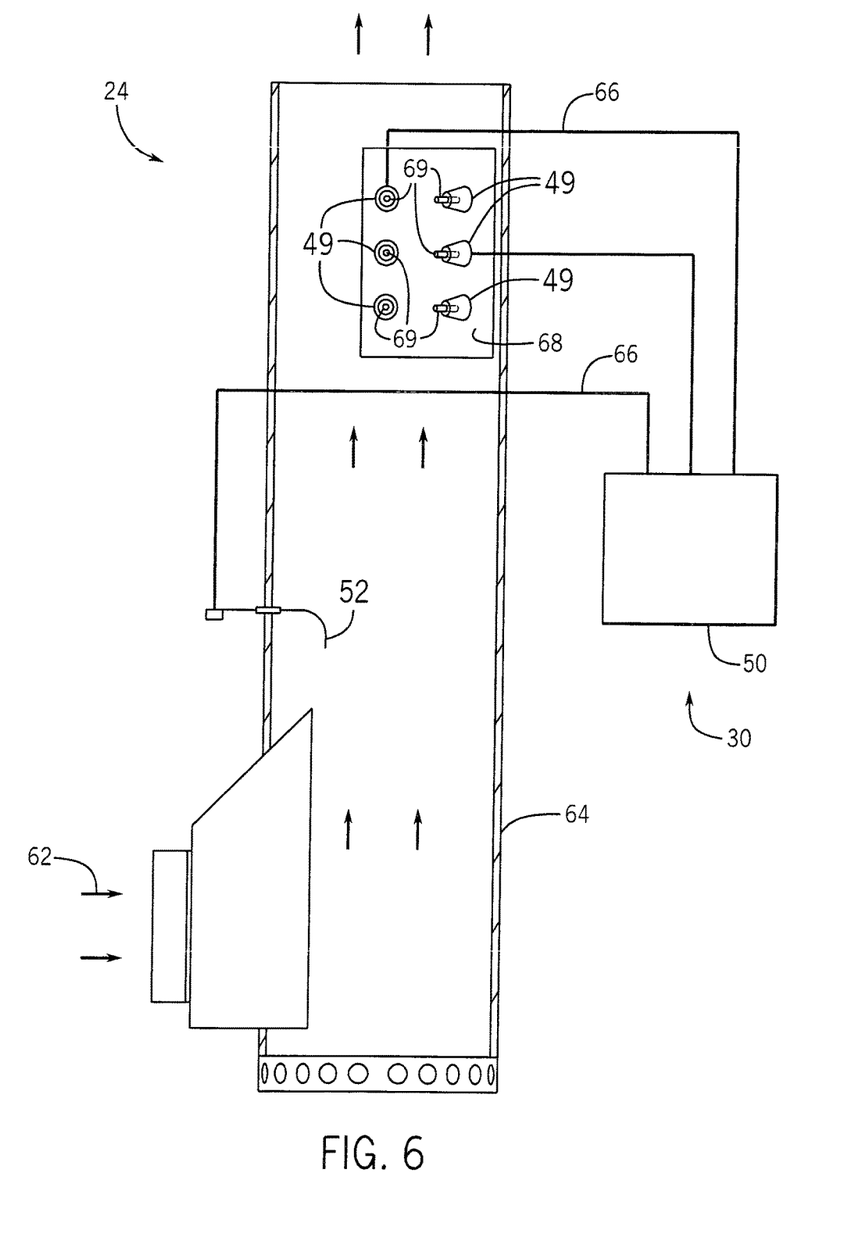
FIG. 6 is a cross-sectional view of an embodiment of the ANC module unit installed in a combustion exhaust stack of the gas turbine engine system of FIG. 1.

FIG. 6 is a cross-sectional view of an embodiment of the ANC module unit installed in the combustion exhaust section 24 of the gas turbine engine system 10 of FIG. 1. A similar system may be installed within the ventilation exhaust section 25 of the gas turbine engine system 10. The combustion exhaust section 24 continues the flow path 62 that flows through from other sections of the gas turbine engine system 10. In the combustion exhaust section 24, the air/gases of the flow path 62 are at a high temperature due to the combustion in the combustor 27 and flow path of the turbine 22. The combustion gases travel along the flow path 62, enter an exhaust stack 64 of the combustion exhaust section 24, and are conveyed upward and out of the stack. Sound from the system 10 also travels out along the flow path 62 and is detected by the microphone 52 positioned on the side of the exhaust stack 64.

The microphone 52 is part of the ANC module unit 30 that controls and cancels sound within the exhaust stack 64 of the combustion exhaust section 24. The microphone 52 may be constructed of heat-resistant material to withstand the high temperatures within the exhaust stack 64, or function as a waveguide to conduct the sound from the stack to a microphone assembly which is located outside the stack, in a temperature-protected environment. Additionally, the microphone 52 may be connected to the control board 50 by wires 66 that convey the sound signal from the microphone 52. This enables the control board 50 to be placed a distance away from the exhaust stack 64 and away from the high temperatures therein.

The control board 50 processes the sound signal from the microphone 52 and conveys a noise-canceling signal to a shaker 49 or set of shakers 49 to control or cancel sound within the exhaust stack 64. The signal from the microphone 52 runs through a transfer function that is based on the location-specific characteristics of the combustion exhaust section 24 and the exhaust stack 64. The characteristics may include temperature and/or speed of the combustion gases flowing through the exhaust stack 64, length of the exhaust stack or other geometric characteristics of the exhaust stack 64, relative location of the microphone 52 and the shakers 49, number of shakers 49, etc. The control board 50 of the ANC module unit 30 then conveys the noise-canceling signal to the shaker 49 or group of shakers 49 associated with the ANC module unit 30. Shakers 49 may be installed external to the stack surface, with connecting rods to connect to the internal vibrating panels to the shakers 49, to allow acoustic driving of the panels without exposing the shaker drivers to the high-temperature conditions that may exist inside the exhaust flow path (i.e. stack).

In the illustrated embodiment, the ANC module unit 30 includes a group of six shakers 49 that are connected to the control board 50 by wires 66. The shakers 49 do not include a traditional diaphragm (which may deteriorate due to the high temperatures within the exhaust stack 64), but are instead connected to a plate 68 by a shaker rod 69. The plate 68 vibrates within the exhaust stack 64 to create the sound that controls and/or cancels the sound upstream along the flow path 62. The plate 68 is rigidly coupled to the shaker rods 69 of the shakers 49, which may be controlled individually or as a group to create the sound based on the signal from the control board 50. Additionally, each shaker 49 and shaker rod 69 may connect to individual plates 68. That is, the illustrated embodiment of FIG. 6 may include six plates 68, one for each individual shaker 49 and shaker rod 69. Furthermore, the exhaust stack 64 may include two shakers 49 for each plate 68 (three total plates 68 in the embodiment illustrated in FIG. 6), or three shakers 49 for each plate 68 (two total plates 68 in the embodiment illustrated in FIG. 6).

Figure 7:
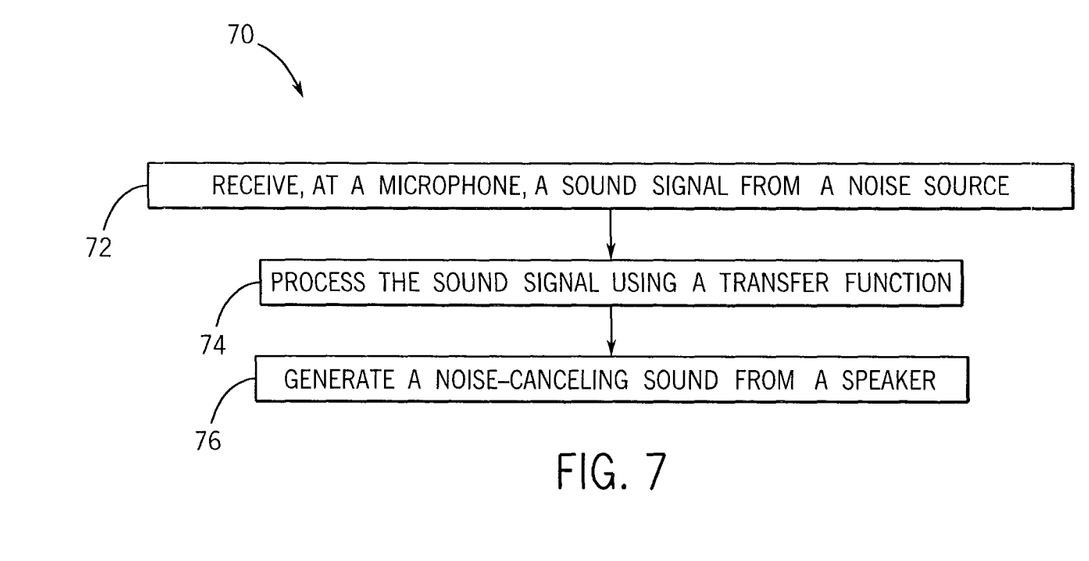
FIG. 7 is a flow chart of a method that may be used by the ANC module unit of the gas turbine engine system of FIG. 1.

FIG. 7 is a flow chart of a method 70 that may be used by the ANC module unit 30 of FIG. 1 to control sound from noise sources. The method 70 includes receiving 72, at the microphone 52, a sound from a noise source. The noise source may be the gas turbine engine 12 described above in regard to FIG. 1, or may be other industrial processes that produce an excess of noise and/or sound. The noise sources can include hot combustion gases and a broad range of frequencies which can be difficult to attenuate with passive foam or non-woven fiber-filled acoustic baffles. The microphone 52 may receive the sound from any location that the noise reaches. That is, the microphone 52 may be placed at a position remote from the control board 50, or the speaker 48. Next, the method 70 includes processing 74 the sound signal using a transfer function. The transfer function may be contained in the control board 50 of the ANC module unit 30, as described above. The transfer function is hard-wired or stored digitally by permanent or temporary memory (ROMs or RAMs) into the control board 50 and thus does not use an error microphone when processing the sound signal. Processing the sound signal may include comparing the sound signal to a table or list of signals that have been programmed into the control board 50. For a given incoming sound signal, the transfer function processes a given outcome. Additionally, the transfer function may include an algorithm that identifies key frequencies within the sound signal, and delays those signals, for example, 180 degrees out of phase.

The method 70 also includes generating 76 a noise-canceling sound from a speaker 48. As with the microphone 52, the speaker 48 may be located remotely from the control board 50, the microphone 52, or both. As described above with regard to FIGS. 1-5, the speaker 48 may be positioned advantageously within a variety of beneficial positions acoustically downstream from the noise source. This enables the ANC module unit 30 to attenuate and/or control noise levels without taking up valuable space or volume within the system 10. The noise-canceling signal is generated in response to the sound received by the microphone 52 and is tuned to the location-specific characteristics of the system 10 in which the ANC module unit 30 is installed. In some embodiments, the noise-canceling signal may be based solely on the sound signal from the microphone 52, the transfer function, and the location-specific characteristics of the microphone 52 and the speaker 48. Location-specific characteristics may include geometric characteristics of the system 10. For example, the noise-canceling signal may be based on the shape of a duct 29 in which the ANC module unit 30 is installed. The duct 29 may have cross-section that has a square or round shape, or may be wider in one direction than another direction. The duct 29 may have many curves and corners, or may have long stretches that are straight. Additionally, the duct 29 may be tapered or may expand as it progresses from the noise source. Each of these geometric characteristics may affect the propagation of the noise-canceling sound, and the noise-canceling signal will be generated accordingly. Furthermore, the location-specific characteristics include the locations of the various components of the ANC module unit 30. For example, the noise-canceling signal will be generated differently if the speaker 48 is positioned on the side of the duct 29 than it will if the speaker 48 is positioned in the middle of the duct 29.

The method 70 also includes generating 76 noise-canceling sounds from additional speakers 48/shakers 49. The ANC module unit 30 may include a number of different speakers 48/shakers 49. The speakers 48/shakers 49 may be connected to a single control board and generate noise-canceling sounds based on the same sound signal received from a single microphone, or may generate noise-canceling sounds based on sound signals received from multiple microphones. Furthermore, the transfer function may process the sound signals to be generated by each speaker 48/shaker 49 separately based on the location-specific characteristics of each combination of microphones 52 and speakers 48/shakers 49.

Technical effects of the invention include a system 10 that includes an ANC module unit 30 within the system 10 that contains a transfer function that has been adjusted to respond to location-specific characteristics of the system 10 and the ANC module unit 30. The transfer function enables cancellation of sound produced by a noise source (e.g., gas turbine engine 12) without the use of an error microphone before the sound exits the system 10. The ANC module unit 30 may thus be installed within systems that have space and/or size restrictions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an Active Noise Control (ANC) module unit configured to be installed within an air intake or exhaust of a power generation unit, comprising:
      an ANC housing shaped to fit within the air intake or exhaust;
      an ANC core configured to be secured within the ANC housing, comprising:
         a microphone configured to detect a sound generated by the power generation unit;
         a control board configured to control a first noise-canceling sound based on a sound signal from the microphone and a set of pre-determined noise reduction transfer functions; and
         a first speaker configured to deliver the first noise-canceling sound to the air intake or exhaust.

2. The system of claim 1, wherein the control board is configured to control the first noise canceling sound based on location-specific characteristics programmed into the set of pre-determined noise reduction transfer function functions for a location in which the ANC module unit is shaped to fit.

3. The system of claim 1, wherein the ANC module unit comprises a waveguide configured to support the ANC core within the ANC housing.

4. The system of claim 3, wherein the waveguide divides a flow path through the ANC module unit into a first discrete region and a second discrete region, to enhance frequency range and dampening of sound by the first noise-canceling sound.

5. The system of claim 4, wherein the ANC module unit comprises a second speaker located in the second discrete region.

6. The system of claim 5, wherein the sound comprises a first frequency range, wherein the second speaker is configured to deliver additional noise-canceling sound to cancel noise of a second frequency range, wherein the first frequency range is equal to or at least partially different from the second frequency range.

7. The system of claim 1, wherein the ANC core is integrated and located within a passive noise control baffle of the ANC module unit, and designed to supplement attenuation provided by the ANC module unit.

8. The system of claim 1, wherein the ANC housing comprises a triangular, a substantially square, a rectangular, a hexagonal, a conical, a circular, a cylindrical, an octagonal, or a spherical geometry that shapes air flow conditions.

9. The system of claim 1, wherein the microphone, control board, and speaker are configured to deliver the first noise canceling sound in a range between approximately 50 Hz and approximately 4000 Hz.

10. A system, comprising:
    an air intake or exhaust for use within a power generation unit, comprising:
       a plurality of Active Noise Control (ANC) module units, wherein each ANC module unit comprises:
          an ANC housing shaped to fit within the air intake or exhaust;
          an ANC core configured to be secured within the ANC housing, comprising:
             a microphone configured to detect a sound generated by the power generation unit;
             a speaker configured to deliver a noise-canceling sound to the air intake or exhaust; and
          a control board comprising transfer functions pre-determined for multiple inputs and configured to control the noise-canceling sounds from ANC module units in the plurality of ANC module units based on a sound signal received from microphones of the plurality of ANC module units.

11. The system of claim 10, wherein the intake or exhaust comprises a first compartment and a second compartment, wherein the first compartment corresponds to a first section of the power generation unit and is configured to house a first set of the plurality of ANC module units, wherein the second compartment corresponds to a second section of the power generation unit and is configured to house a second set of the plurality of ANC module units.

12. The system of claim 10, wherein the plurality of ANC module units are arranged in series such that each ANC module unit successively delivers a respective noise-canceling sound along the flow of the sound.

13. The system of claim 10, wherein the plurality of ANC module units are arranged in parallel such that each ANC module unit concurrently delivers a respective noise-canceling sound along the flow of the sound.

14. The system of claim 10, wherein each of the ANC module units of the plurality of ANC module units is configured to dampen a particular frequency range of the sound.

15. The system of claim 10, wherein each of the ANC module units of the plurality of ANC module units is configured to dampen a unique frequency range.

16. The system of claim 10, wherein a first ANC module unit of the plurality of ANC module units is positioned at a first position, a second ANC module unit of the plurality of ANC module units is positioned at a second position, and the first position is different than the second position.

17. A system, comprising:
an Active Noise Control (ANC) module unit for use within a combustion exhaust of a power generation unit, comprising:
  a microphone configured to detect a sound signal generated within the combustion exhaust of the power generation unit;
  a control board configured to receive the sound signal from the microphone and send a noise-canceling signal based on the sound signal from the microphone and a set of pre-determined noise reduction transfer functions; and
  a plurality of shakers configured to respond to the noise-canceling signal to shake a plate or an array of plates, and produce noise-canceling sound in the combustion exhaust duct or stack.

18. The system of claim 17, wherein the shakers are attached to the plate via a shaker rod.

19. The system of claim 17, wherein the microphone and the plate are configured to operate in temperatures greater than approximately 250 degrees Celsius.

20. The system of claim 17, wherein the control board is configured to control the noise canceling sound based on location-specific characteristics programmed into the set of pre-determined noise reduction transfer functions for the location of the ANC module unit in the combustion exhaust duct or stack.

21. The system of claim 1, wherein the ANC module unit is configured to provide enhanced flow conditions relative to a passive noise abatement system to generate increased performance of the power generation unit.

* * * * *